US012677361B2

United States Patent
(12) United States Patent
Ran et al.

(10) Patent No.: US 12,677,361 B2
(45) Date of Patent: Jul. 7, 2026

(54) TRANSFORMER-BASED LIGHT-SOURCE DRIVING SYSTEMS

(71) Applicant: O2Micro, Inc., Santa Clara, CA (US)

(72) Inventors: Kaiping Ran, Fremont, CA (US); Sheng-Tai Lee, Taipei City (TW); Weiwei Song, Wuhan (CN)

(73) Assignee: O2Micro Inc., Santa Clara, CA (US)

( * ) Notice: Subject to any disclaimer, the term of this patent is extended or adjusted under 35 U.S.C. 154(b) by 105 days.

(21) Appl. No.: 18/671,561

(22) Filed: May 22, 2024

(65) Prior Publication Data

US 2025/0365830 A1 Nov. 27, 2025

(51) Int. Cl.

| | |
|---|---|
| ***H05B 45/3725*** | (2020.01) |
| ***H01F 30/04*** | (2006.01) |
| ***H05B 45/325*** | (2020.01) |
| ***H05B 45/46*** | (2020.01) |
| ***H05B 47/17*** | (2020.01) |

(52) U.S. Cl.

CPC ......... *H05B 45/3725* (2020.01); *H01F 30/04* (2013.01); *H05B 45/325* (2020.01); *H05B 45/46* (2020.01); *H05B 47/17* (2020.01)

(58) Field of Classification Search

CPC .. H05B 45/3725; H05B 45/325; H05B 45/46; H05B 47/17; H01F 30/04

See application file for complete search history.

(56) References Cited

U.S. PATENT DOCUMENTS

| | | | | |
|---|---|---|---|---|
| 9,485,819 | B2 * | 11/2016 | Liu | H05B 45/3725 |
| 2012/0194078 | A1 * | 8/2012 | Ren | H05B 45/3725 315/122 |
| 2014/0232282 | A1 * | 8/2014 | Rooijackers | H02M 3/01 363/21.02 |
| 2016/0205736 | A1 * | 7/2016 | Jin | H05B 45/385 315/210 |
| 2022/0338321 | A1 * | 10/2022 | Hsia | H05B 45/325 |

FOREIGN PATENT DOCUMENTS

| | | | | | |
|---|---|---|---|---|---|
| CN | 102630111 | A | * | 8/2012 | H05B 45/3577 |
| CN | 102651939 | A | * | 8/2012 | H05B 45/46 |
| CN | 103298200 | A | * | 9/2013 | H05B 45/395 |
| CN | 105657900 | A | * | 6/2016 | H05B 45/382 |

* cited by examiner

*Primary Examiner* — Abdullah A Riyami
*Assistant Examiner* — Syed M Kaiser

(57) ABSTRACT

A light-source driving system includes a first controller, a switch circuit, and a second controller. The first controller is configured to control power transferred from a primary winding of a transformer to a first secondary winding and a second secondary winding of the transformer according to a load of a system circuit powered by the second secondary winding. The switch circuit is configured to enable the first secondary winding to provide a portion of the transferred power to a light source when the switch circuit is turned on. The second controller is coupled to the switch circuit and the first controller and is configured to monitor a status of the light source and control the switch circuit according to the status.

17 Claims, 6 Drawing Sheets

TRANSFORMER-BASED LIGHT-SOURCE DRIVING SYSTEMS

BACKGROUND

FIG. 1 illustrates a conventional light-source driving system 100 that drives a light source 108, e.g., an LED (light-emitting diode) back light. The light-source driving system 100 is coupled to a power source VAC via a rectifier 120, and includes a transformer 110, a primary-side controller 102, a secondary-side controller 104, a DC/DC (direct-current to direct-current) converter 118, and a system circuit 106.

The rectifier 120 rectifies an AC (alternating current) voltage VAC (e.g., 220 VAC, 110 VAC, or the like from an electric supply) to provide a rectified power to the transformer 110. The transformer 110 includes a primary winding 112, a first secondary winding 114, and a second secondary winding 116. The primary-side controller 102 alternately turns on and off a switch $Q_{PR}$ coupled to the primary winding 112 such that when the switch $Q_{PR}$ is off, the transformer 110 transfers power from the primary winding 112 to the secondary windings 114 and 116. The light source 108 is powered by the first secondary winding 114. The secondary-side controller 104 and the system circuit 106 are powered by the second secondary winding 116.

The light source 108 can emit light when a current 1108 flows through the light source 108. The secondary-side controller 104 can monitor a status of the light source 108 (e.g., whether or not the light source 108 receives sufficient power) and generate a control signal 122 according to the status. The primary-side controller 102 can control the on and off of the switch $Q_{PR}$ according to the control signal 122 such that the light source receives sufficient power and therefore the current $I_{108}$ through the light source 108 is maintained at a target level. A user can increase or decrease the brightness of light emitted from the light source 108 by increasing or decreasing the target level, which can result in an increase or decrease in the power transferred from the primary winding 112 to the secondary windings 114 and 116. Accordingly, an output power of the second secondary winding 116, e.g., represented by an input voltage $V_{INPUT}$ of the DC/DC converter 118, changes as the preset target level of the current 1108 changes. Thus, the light-source driving system 100 further includes a DC/DC converter 118 that converts the output power of the second secondary winding 116, e.g., represented by the voltage $V_{INPUT}$, to a relatively stable voltage $V_{SYS}$ to power the secondary-side controller 104 and the system circuit 106.

However, DC/DC converters (e.g., usually including components such as inductors, high-power transistors, feedback circuits, comparators, PWM generators, high-power transistors' drivers, etc.) can be relatively expensive and occupy a relatively large space on printed circuit boards.

Additionally, the light source 108 may operate in a high-power mode (e.g., when it is set to emit light at a full brightness level) or in a low-power mode (e.g., when the light is dimmed to be at a relatively low brightness level, such as 10% of the full brightness level). The primary-side controller 102 controls the switch $Q_{PR}$ such that the power received at the first secondary winding 114, as well as the power received at the second secondary winding 116, can increase when the light source 108 operates in the high-power mode, or decrease when the light source 108 operates in the low-power mode. The load of the system circuit 106 can change over time, e.g., increase or decrease, depending on practical situations in real-time. The system load may increase or decrease regardless of the operation mode of the light source 108. As a result, if the system circuit 106 is a heavy load when the light source 108 operates in the low-power mode, the power received at the second secondary winding 116 may not be adequate to support the heavy load of the system circuit 106. Similarly, if the system circuit 106 is a light load when the light source 108 operates in the high-power mode, the power received at the second secondary winding 116 may be so high that the DC/DC converter 118 cannot perform the power conversion properly to support the light load of the system circuit 106.

SUMMARY

In an embodiment, a light-source driving system includes a first controller, a switch circuit, and a second controller. The first controller is configured to control power transferred from a primary winding of a transformer to a first secondary winding and a second secondary winding of the transformer according to a load of a system circuit powered by the second secondary winding. The switch circuit is configured to enable the first secondary winding to provide a portion of the transferred power to a light source when the switch circuit is turned on. The second controller is coupled to the switch circuit and the first controller and is configured to monitor a status of the light source and control the switch circuit according to the status.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
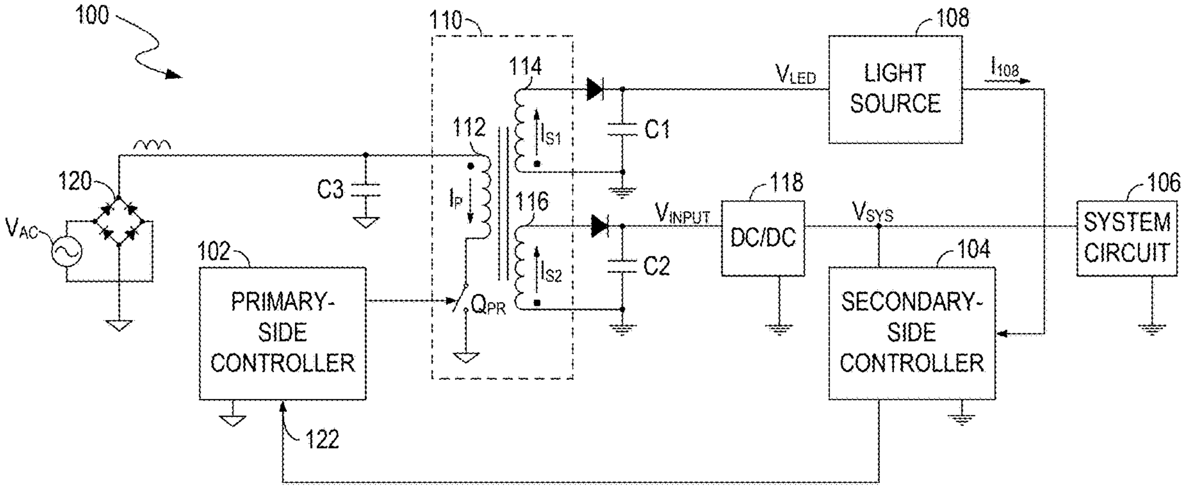
FIG. 1 PRIOR ART
FIG. 1 illustrates a block diagram of a conventional light-source driving system.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention provide transformer-based light-source driving systems. In an embodiment of the light-source driving system, a transformer includes a primary winding, a first secondary winding, and a second secondary winding, and can transfer power from the primary winding to the first and second secondary windings. The first secondary winding can power a light source. The second secondary winding can power a controller that monitors and controls the light source and can further power a system circuit. The power transferred from the primary winding to the first and second secondary windings can be increased if a load of the system circuit (hereinafter, system load) increases, or decreased if the system load decreases such that the system circuit and the controller can operate properly. The light-source driving system further includes a switch circuit coupled to the first primary winding. The controller can enable the first primary winding to provide power to the light source by turning on the switch circuit, and can pause the first primary winding providing power to the light source by turning off the switch circuit. Thus, the controller can adjust the brightness of light emitted from the light source by controlling, e.g., a duty cycle of, the switch circuit. As a result, the DC/DC converter in the conventional light-source driving system can be omitted from the light-source driving system in an embodiment of the present invention, which lowers the cost of the light-source driving system and reduces the size of the printed circuit board thereof. In addition, the controller can adjust the brightness of light emitted from the light source to a target level by increasing or reducing the duty cycle of the switch circuit whether the system load is light, normal, or heavy. More specifically, if the light source operates in a low-power mode when the system load is very heavy, the controller can set the duty cycle of the switch circuit to be very low; or if the light source operates in a high-power mode when the system load is very light, the controller can set the duty cycle of the switch circuit to be very high. Consequently, both the light source and the system circuit can operate properly regardless of the power mode of the light source and the level of the system load.

Figure 2A:
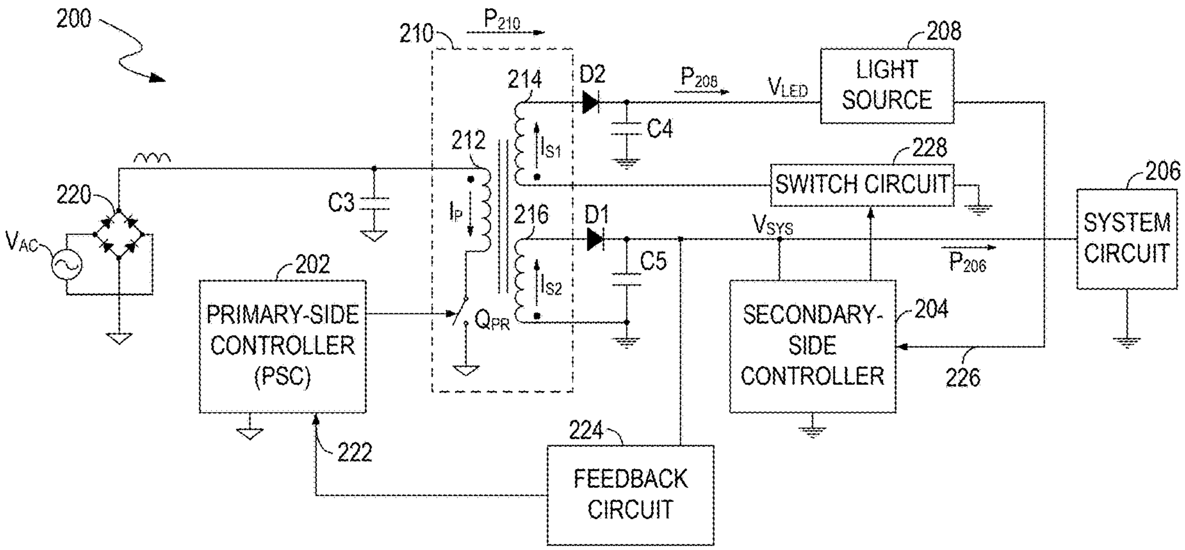
FIG. 2A illustrates a block diagram of an example of a light-source driving system, in an embodiment of the present invention.

FIG. 2A illustrates a block diagram of an example of a light-source driving system 200 that drives a light source 208, in an embodiment of the present invention. As shown in FIG. 2A, the light-source driving system 200 is coupled to a power source VAC via a rectifier 220. The light-source driving system 200 includes a power converter 210 (e.g., a transformer), a primary-side controller 202, a secondary-side controller 204, a switch circuit 228, a feedback circuit 224, and a system circuit 206. In an embodiment, the rectifier 220 rectifies an AC voltage VAC (e.g., 220 VAC, 110 VAC, or the like from an electric supply) to provide a rectified power to the transformer 210. The transformer 210 includes a primary winding 212, a first secondary winding 214, and a second secondary winding 216. The primary-side controller 202 alternately turns on and off a switch $Q_{PR}$ coupled to the primary winding 212 such that the transformer 210 transfers power $P_{210}$ from the primary winding 212 to the secondary windings 214 and 216 when the switch $Q_{PR}$ is turned off. The light source 208 is powered by the first secondary winding 214. The secondary-side controller 204 and the system circuit 206 can be powered by the second secondary winding 216.

In an embodiment, the primary-side controller 202 (e.g., referred to as a first controller) controls the power $P_{210}$ transferred from the primary winding 212 to the first and second secondary windings 214 and 216 according to a load of the system circuit 206 (hereinafter, system load $SL_{206}$) that is powered by the second secondary winding 216. More specifically, as shown in FIG. 2A, the feedback circuit 224 is coupled to a power supply terminal of the system circuit 206 and senses a power supply voltage $V_{SYS}$ of the system circuit 206. The feedback circuit 224 can generate a control signal 222 according to the power supply voltage $V_{SYS}$. The primary-side controller 202 can periodically turn on and off the switch $Q_{PR}$ and increase or decrease a duty cycle of the switch $Q_{PR}$ according to the control signal 222. As used herein, "a duty cycle of a switch" means a ratio of a time period during which the switch is turned on to a time period of a switching cycle of the switch. For example, if the power supply voltage $V_{SYS}$ decreases, e.g., representing that the system load $SL_{206}$ increases, then the control signal 222 can control the primary-side controller 202 to increase the transferred power $P_{210}$ in the transformer 210, e.g., by increasing the duty cycle of the switch $Q_{PR}$. If the power supply voltage $V_{SYS}$ increases, e.g., representing that the system load $SL_{206}$ decreases, then the control signal 222 can control the primary-side controller 202 to decrease the transferred power $P_{210}$ in the transformer 210, e.g., by decreasing the duty cycle of the switch $Q_{PR}$. As a result, the second secondary winding 216 can provide a relatively stable voltage $V_{SYS}$ to power the system circuit 206. The relatively stable voltage $V_{SYS}$ can also be used to power the secondary-side controller 204 so that an additional power supply circuit for the secondary-side controller 204 can be omitted.

In addition, in an embodiment, the switch circuit 228 can enable the first secondary winding 214 to provide a portion $P_{208}$ of the power $P_{210}$ to the light source 208 when the switch circuit 228 is turned on. The secondary-side controller 204 (e.g., referred to as a second controller) can monitor a status of the light source 208 and control the switch circuit 228 according to the status. For example, the secondary-side controller 204 can periodically turn on and off the switch circuit 228 and controls a duty cycle of the switch circuit 228 according to the status of the light source 208. As used herein, "a duty cycle of a switch circuit" means a ratio of a time period during which the switch circuit is turned on to a time period of a switching cycle of the switch circuit.

More specifically, in an embodiment, if the light source 208 receives sufficient power, then the light source 208 is in a normal-power state and can emit light at a target brightness level. If the light source 208 does not receive adequate power, then the light source 208 is in an under-power state and may not emit light at the target brightness level. Thus, the secondary-side controller 204 is configured to control the light source 208 to be in the normal-power state.

In an embodiment, a status signal 226, e.g., a voltage, from the light source 208 can indicate whether the light source 208 is in the normal-power mode, and the status signal 226 is monitored by the secondary-side controller 204. For example, if the status signal 226 is at a preset reference level, then the light source 208 is in the normal-power state. In an embodiment, if the status signal 226 is less than the reference level, the secondary-side controller 204 increases the duty cycle of the switch circuit 228; or if the status signal 226 is greater than the reference level, the secondary-side controller 204 decreases the duty cycle of the switch circuit 228. As a result, the status signal 226 is adjusted to the reference level and so the light source 208 is in the normal-power state.

FIG. 2A shows that the system circuit 206 is separate from the secondary-side controller 204; however, the invention is not so limited. In some embodiments of the present invention, the system circuit 206 can include the secondary-side controller 204 and other circuitry that are powered by the second secondary winding 216. As used herein, "a load of the system circuit 206" or "system load $SL_{206}$" can include a total load of the secondary-side controller 204 and the "other circuitry."

In an embodiment, the system circuit 206 (e.g., including the controller 204) has a minimum operating power $P_{MIN206}$ (e.g., depending on its minimum operating voltage and minimum operation current). Thus, even if the system circuit 206 is a light load, the operating power of the system circuit 206 (e.g., represented by $P_{206}$) is greater than the minimum operating power $P_{MIN206}$. The light source 208 has a maximum operating power $P_{MAX208}$ (e.g., depending on its maximum operating voltage a maximum operating current). Thus, even if the light source 208 operates in a high-power mode, the operating power of the light source 208 (e.g., represented by $P_{208}$) is less than the maximum operating power $P_{MAX208}$. In an embodiment, a turns-to-turns ratio of the secondary windings 214 and 216, e.g., a ratio of the number $N_{214}$ of the turns of the first secondary winding 214 to the number $N_{216}$ of the turns of the second secondary winding 216, is set such that if the operating power $P_{206}$ of the system circuit 206 is equal to the minimum operating power $P_{MIN206}$, the first secondary winding 214 is capable of providing the light source 208 with operating power $P_{208}$ that is not less than the maximum operating power $P_{MAX208}$. More specifically, if the turns-to-turns ratio $N_{214}/N_{216}$ is large enough, then the first secondary winding 214 can receive sufficient power from the primary winding 212 to support the light source 208 to operate in a high-power mode when the second secondary winding 216 receives relatively low power from the primary winding 212 to maintain the system circuit 206 in the light load condition.

Additionally, in an embodiment, when the system circuit 206 is a heavy load, the second secondary winding 216 receives relatively high power from the primary winding 212, which can result in the first secondary winding 214 receiving relatively high power from the primary winding 212. If the light source 208 is set to operate in a low-power mode, then the secondary-side controller 204 can decrease the duty cycle of the switch circuit 228 to be relatively low such that the light source 208 receives relatively low power from the first secondary winding 214.

Accordingly, the DC/DC converter in the conventional light-source driving system 100 can be omitted in the light-source driving system 200 in an embodiment of the present invention, which lowers the cost of the light-source driving system 200 and reduces the size of the printed circuit board thereof. In addition, under the control of the primary-side controller 202, the second secondary winding 216 can provide the system circuit 206 with power at a desired level whether the system circuit 206 is a light load, normal load, or heavy load. Moreover, regardless of the load condition of the system circuit 206, the secondary-side controller 204 can control the duty cycle of the switch circuit 228 such that the light source 208 operates in a desired operation mode.

Figure 2B:
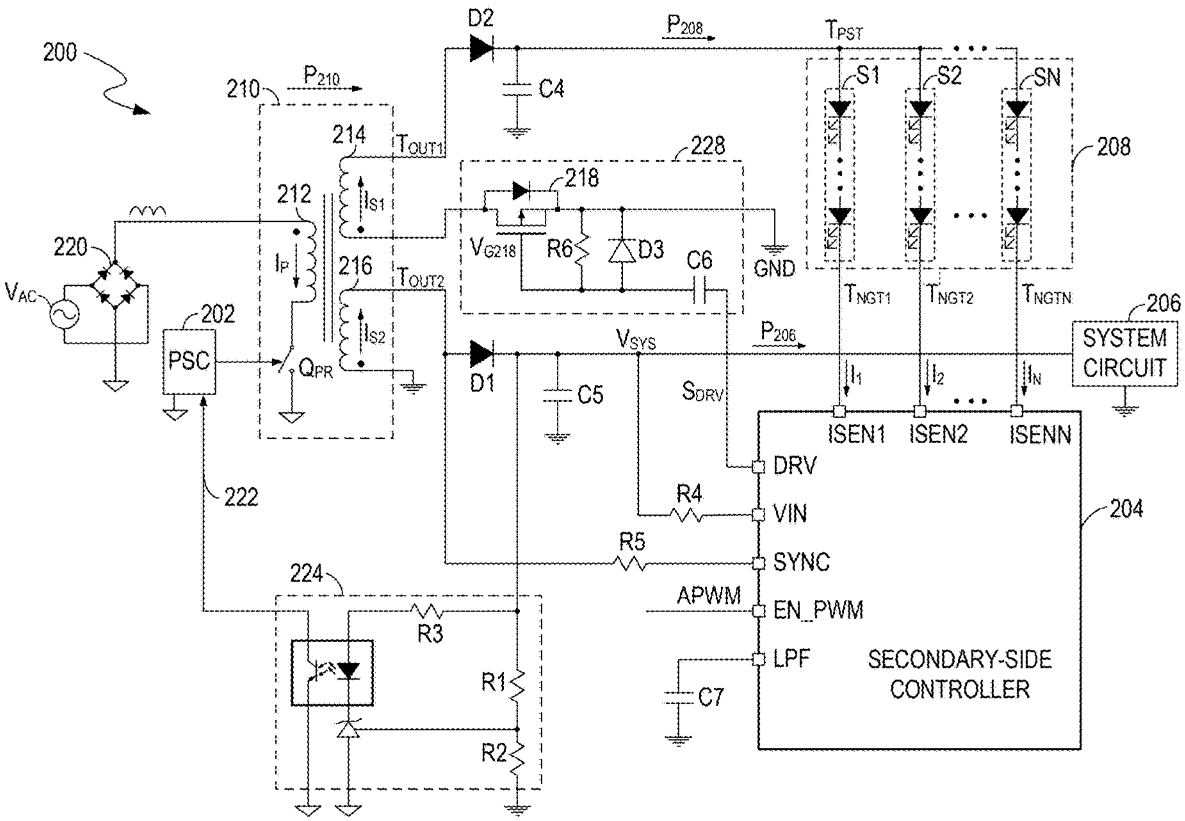
FIG. 2B illustrates a circuit diagram of an example of a light-source driving system, in an embodiment of the present invention.

FIG. 2B illustrates a circuit diagram of an example of the light-source driving system 200, in an embodiment of the present invention. FIG. 2B is described in combination with FIG. 2A. In an embodiment, the light source 208 includes LED (light-emitting diode) strings S1, S2, . . . , and SN (where N is a natural number) and each LED string includes one or more LEDs. The positive terminals $T_{PST}$ of the LED strings S1, S2, . . . , and SN can receive power $P_{208}$ from the first secondary winding 214. The secondary-side controller 204 can include monitoring terminals ISEN1, ISEN2, . . . , and ISENN, respectively coupled to the negative terminals $T_{NGT1}$, $T_{NGT2}$, . . . , and $T_{NGTN}$ of the LED strings S1, S2, . . . , and SN, and configured to monitor statuses of the LED strings S1, S2, . . . , and SN. The secondary-side controller 204 can also include a driving terminal DRV, a power input terminal VIN, a synchronizing terminal SYNC, an adjusting terminal EN_PWM, and an input/output terminal LPF.

In an embodiment, when the light source 208 receives sufficient power, e.g., in the abovementioned normal-power state, currents $I_1$, $I_2$, . . . , and $I_N$ that are adjusted to their respective target levels can be generated to flow through the LED strings S1, S2, . . . , and SN so that the LED strings S1, S2, . . . , and SN emit light at target brightness levels. In an embodiment, the currents $I_1$, $I_2$, . . . , and $I_N$ flow through the monitoring terminals ISEN1, ISEN2, . . . , and ISENN, respectively, and voltage levels $V_{ISEN1}$, $V_{ISEN2}$, . . . , and $V_{ISENN}$ (not shown in FIG. 2B) at the monitoring terminals ISEN1, ISEN2, . . . , and ISENN (or at the negative terminals $T_{NGT1}$, $T_{NGT2}$, . . . , and $T_{NGTN}$ of the LED strings S1, S2, . . . , and SN) can represent the status of the light source 208. Thus, the monitoring terminals ISEN1, ISEN2, . . . , and ISENN can be configured to monitor the status of the light source 208 by sensing the voltage levels $V_{ISEN1}$, $V_{ISEN2}$, . . . , and $V_{ISENN}$ at the negative terminals $T_{NGT1}$, $T_{NGT2}$, . . . , and $I_{NGTN}$ of the LED strings S1, S2, . . . , and SN.

In an embodiment, when the light source 208 receives sufficient power, each of the voltage levels $V_{ISEN1}$, $V_{ISEN2}$, . . . , and $V_{ISENN}$ can be equal to or greater than a threshold voltage, and each of the currents $I_1$, $I_2$, . . . , and $I_N$ can be adjusted to a target level. If the light source 208 does not receive adequate power, then one or more of the voltage levels $V_{ISEN1}$, $V_{ISEN2}$, . . . , and $V_{ISENN}$ are less than the threshold voltage, and one or more of the currents $I_1$, $I_2$, . . . , and $I_N$ are less than the target level. In an embodiment, a preset reference level $V_{REF}$, e.g., equal to or slightly greater than the threshold voltage, can be provided and compared with a voltage level $minV_{ISEN}$ selected from the voltage levels $V_{ISEN1}$, $V_{ISEN2}$, . . . , and $V_{ISENN}$. Control circuitry in the secondary-side controller 204 can control the duty cycle of the switch circuit 228 according to the comparison such that the selected voltage level $minV_{ISEN}$ is adjusted to the reference level $V_{REF}$. In an embodiment, the voltage level $minV_{ISEN}$ includes a minimum voltage level of the voltage levels $V_{ISEN1}$, $V_{ISEN2}$, . . . , and $V_{ISENN}$. As a result, the voltage levels $V_{ISEN1}$, $V_{ISEN2}$, . . . , and $V_{ISENN}$ can be adjusted to be equal to greater than the reference level $V_{REF}$. In an embodiment, the secondary-side controller 204 can increase the duty cycle of the switch circuit 228 if the selected voltage level $minV_{ISEN}$ is less than the reference level $V_{REF}$, and can reduce the duty cycle of the switch circuit 228 if the selected voltage level $minV_{ISEN}$ is greater than the reference level $V_{REF}$. As a result, the secondary-side controller 204 can maintain the light source 208 in the normal-power state. In an embodiment, the status signal 226 shown in FIG. 2A includes the voltage levels $V_{ISEN1}$, $V_{ISEN2}$, . . . , and $V_{ISENN}$.

In an embodiment, the driving terminal DRV is configured to provide a driving signal $S_{DRV}$ to control the switch circuit 228. For example, the driving signal $S_{DRV}$ can include a pulse signal such as a PWM (pulse width modulation)

signal. The switch circuit 228 may be turned on by a falling edge (or a rising edge) of the driving signal $S_{DRV}$ and turned off by a rising edge (or a falling edge) of the driving signal $S_{DRV}$.

Taking FIG. 2B for example, the switch circuit 228 may include a p-MOSFET (p-channel metal-oxide-semiconductor field-effect transistor) 218, a resistor R6 coupled between the gate and source of the p-MOSFET 218, a diode D3 having a positive terminal coupled to the gate of the p-MOSFET 218 and a negative terminal coupled to the source of the p-MOSFET 218, and a capacitor C6 coupled between the gate of the p-MOSFET 218 and the driving terminal DRV. In an embodiment, the p-MOSFET 218 can be turned on if a source-gate voltage $V_{SG}$ of the p-MOSFET 218 is greater than a turn-on threshold $V_{TH}$ (e.g., $V_{SG}>V_{TH}>0$). In the example of FIG. 2B, the source of the p-MOSFET 218 is electrically connected to a reference ground GND. Thus, the p-MOSFET 218 can be turned on if a negative gate voltage $V_{G218}$ is applied to the gate of the p-MOSFET 218 and the negative voltage $V_{G218}$ is lower than the negative threshold $-V_{TH}$. In the example of FIG. 2B, a falling edge of the driving signal $S_{DRV}$ can cause the gate voltage $V_{G218}$ of the p-MOSFET 218 to be lower than the negative threshold $-V_{TH}$, and a rising edge of the driving signal $S_{DRV}$ can cause the gate voltage $V_{G218}$ to be higher than the negative threshold $-V_{TH}$. As a result, the switch circuit 228 can be turned on by a falling edge of the driving signal $S_{DRV}$ and turned off by a rising edge of the driving signal $S_{DRV}$. In addition, in a default situation when there is no signal generated at the driving terminal DRV, the p-MOSFET 218 is off and therefore the switch circuit 228 is off.

Although FIG. 2B shows a circuit structure, including components 218, R6, D3 and C6, in the switch circuit 228, the invention is not so limited. In another embodiment, the switch circuit 228 can have a different circuit structure and different components. For example, the switch circuit 228 may include an n-MOSFET (n-channel metal-oxide-semiconductor field-effect transistor).

In an embodiment, the synchronizing terminal SYNC is configured to detect an electrical polarity of an output terminal $T_{OUT2}$ of the second secondary winding 216. When a positive polarity is detected at the synchronizing terminal SYNC, the secondary-side controller 204 can generate the driving signal $S_{DRV}$ according to the status of the light source 208 (e.g., including the abovementioned voltage levels $V_{ISEN1}$, $V_{ISEN2}$, . . . , and $V_{ISENN}$). When the positive polarity is not detected at the synchronizing terminal SYNC, the secondary-side controller 204 can pause or stop generating the driving signal $S_{DRV}$.

More specifically, in an embodiment, when the switch $Q_{PR}$ coupled to the primary winding 212 is turned on, a primary current $I_P$ can flow through the primary winding 212 and the primary current $I_P$ increases, which increases a magnetic flux in the transformer 210 and the transformer 210 stores magnetic energies. During the time when the switch $Q_{PR}$ is on, the electrical polarity of the output terminal $T_{OUT2}$ of the second secondary winding 216 can be negative, and no currents are generated on the secondary windings 214 and 216. When the switch $Q_{PR}$ is turned off after being turned on for a while, the transformer 210 releases the magnetic energies to the secondary windings 214 and 216, which results in secondary currents $I_{S1}$ and $I_{S2}$ generated in the secondary windings 214 and 216. During the time when the transformer 210 is releasing magnetic energies, the electrical polarity of the output terminal $T_{OUT2}$ of the second secondary winding 216 is positive, and the first secondary winding 214 can provide power $P_{208}$ to the light source 208 if the switch circuit 228 is turned on. In this situation, the driving signal $S_{DRV}$ can be generated to control the switch circuit 228, thereby controlling a level of the power $P_{208}$. During the time when the switch $Q_{PR}$ is on (e.g., when the positive polarity is not detected at the output terminal $T_{OUT2}$), the first secondary winding 214 does not provide power to the light source 208. Thus, the secondary-side controller 204 can pause or stop generating the driving signal $S_{DRV}$, e.g., to reduce power consumption.

In an embodiment, the adjusting terminal EN_PWM is configured to receive an adjusting signal APWM indicating a target level of a current (e.g., $I_1$, $I_2$, . . . , $I_N$) through the light source 208. The secondary-side controller 204 can adjust the current (e.g., $I_1$, $I_2$, . . . , $I_N$) of the light source 208 to the target level when the voltage levels at the monitoring terminals ISEN1, ISEN2, . . . , and ISENN indicate that the light source 208 is in the abovementioned normal-power state. More specifically, as mentioned above, when the voltage levels at the monitoring terminals ISEN1, ISEN2, . . . , and ISENN are at or approximately at the abovementioned reference level $V_{REF}$, it indicates that the light source 208 is in the normal-power state and receives sufficient power. Thus, the secondary-side controller 204 can adjust the currents $I_1$, $I_2$, . . . , and $I_N$ of the LED strings S1, S2, . . . , and SN to the target level.

Figure 3:
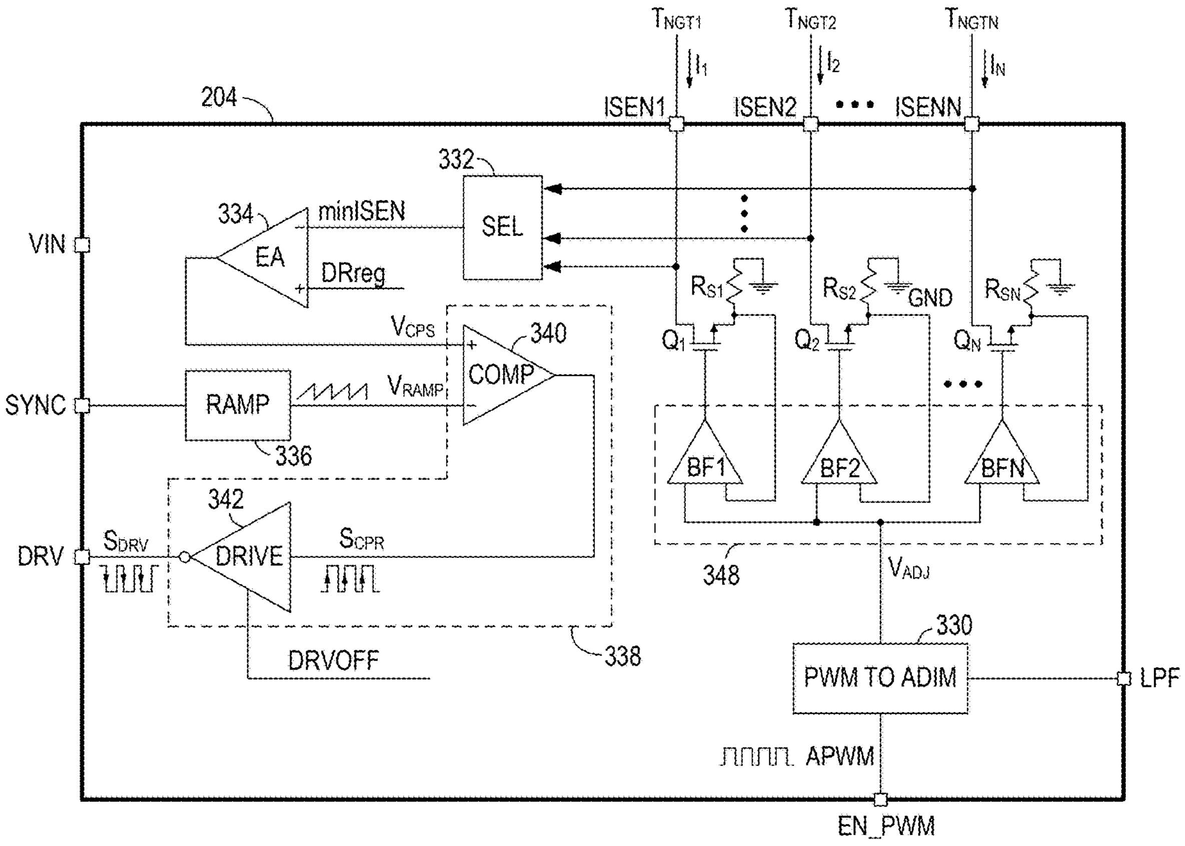
FIG. 3 illustrates a circuit diagram of an example of a secondary-side controller, in an embodiment of the present invention.

FIG. 3 illustrates a circuit diagram of an example of the secondary-side controller 204, in an embodiment of the present invention. FIG. 3 is described in combination with FIG. 2A and FIG. 2B. As shown in FIG. 3, the controller 204 can include a selector 332, an error amplifier 334, a ramp generator 336, a comparison circuit 338, a converter 330, and an adjusting circuit 348. The controller 204 may also include a set of transistors $Q_1$, $Q_2$, . . . , and $Q_N$ (e.g., MOSFETs) and a set of sense resistors $R_{S1}$, $R_{S2}$, . . . , and $R_{SN}$.

As mentioned in relation to FIG. 2B, the negative terminals $T_{NGT1}$, $T_{NGT2}$, . . . , and $I_{NGTN}$ of the LED strings S1, S2, . . . , and SN are respectively coupled to the monitoring terminals ISEN1, ISEN2, . . . , and ISENN. In an embodiment, each negative terminal $T_{NGT1}$, $T_{NGT2}$, . . . , $T_{NGTN}$ is coupled to the reference ground GND through a respective transistor $Q_1$, $Q_2$, . . . , $Q_N$ and a respective sense resistor $R_{S1}$, $R_{S2}$, . . . , $R_{SN}$. For example, the negative terminal $T_{NGT1}$ of the LED string S1 is coupled to the reference ground GND through the transistor $Q_1$ and the resistor $R_{S1}$. A voltage $V_{RS1}$ across the resistor $R_{S1}$ can represent, e.g., is linearly proportional to, a current $I_1$ that flows through the LED string S1. Similarly, the negative terminal $T_{NGT2}$ of the LED string S2 is coupled to the reference ground GND through the transistor $Q_2$ and the resistor $R_{S2}$. A voltage $V_{RS2}$ across the resistor $R_{S2}$ can represent, e.g., is linearly proportional to, a current $I_2$ that flows through the LED string S2. Accordingly, voltages $V_{RS1}$, $V_{RS2}$, . . . , and $V_{RSN}$ (not shown in FIG. 3) across the resistors $R_{S1}$, $R_{S2}$, . . . , and $R_{SN}$ can represent currents $I_1$, $I_2$, . . . , and $I_N$ flowing through the LEDs strings S1, S2, . . . , and SN, respectively.

In an embodiment, the converter 330 includes a PWM-duty-cycle to analog-dimming converter (PWM to ADIM). More specifically, the converter 330 can receive an adjusting signal APWM via the adjusting terminal EN_PWM. The adjusting signal APWM can include a PWM signal. The converter 330 can convert a duty cycle of the PWM signal APWM to an adjusting voltage $V_{ADJ}$, e.g., by using an integrator (not shown in FIG. 3). For example, the adjusting voltage $V_{ADJ}$ can increase if the duty cycle of the signal APWM increases, or decrease if the duty cycle of the signal APWM decreases. As used herein, a duty cycle of a PWM signal represents the proportion of time the PWM signal spends on a logic-high state within one period.

In an embodiment, the adjusting circuit 348 can apply the adjusting voltage $V_{ADJ}$ to the resistors $R_{S1}$, $R_{S2}$, . . . , and $R_{SN}$ by controlling the transistors $Q_1$, $Q_2$, . . . , and $Q_N$ such that the currents $I_1$, $I_2$, . . . , and $I_N$ flowing through LED strings S1, S2, . . . , and SN are adjusted to a target level. More specifically, as shown in FIG. 3, the adjusting circuit 348 can include operational amplifiers BF1, BF2, . . . , and BFN, e.g., also referred to buffers BF1, BF2, . . . , and BFN. The operational amplifier BF1 can compare the adjusting voltage $V_{ADJ}$ with the voltage $V_{RS1}$ of resistor $R_{S1}$ and control the transistor $Q_1$ according to the comparison. As a result, the voltage $V_{RS1}$ of resistor $R_{S1}$ can be clamped at the level of the adjusting voltage $V_{ADJ}$. In other words, the operational amplifier BF1 can apply the adjusting voltage $V_{ADJ}$ to the resistor $R_{S1}$. Similarly, the operational amplifiers BF2, BF3, . . . , and BFN can apply the adjusting voltage $V_{ADJ}$ to the resistors $R_{S2}$, $R_{S3}$, . . . , and $R_{SN}$. In an embodiment, the resistors $R_{S1}$, $R_{S2}$, . . . , and $R_{SN}$ are configured to have the same resistance $R_S$. Thus, when the adjusting voltage $V_{ADJ}$ is applied to the resistors $R_{S1}$, $R_{S2}$, . . . , and $R_{SN}$, the currents $I_1$, $I_2$, . . . , and $I_N$ through the LED strings S1, S2, . . . , and SN can be configured to have the same current level of $V_{ADJ}/R_S$. In an embodiment, the abovementioned target level of the currents $I_1$, $I_2$, . . . , and $I_N$ includes the current level $V_{ADJ}/R_s$. In an embodiment, the adjusting circuit 348 can function as a balance circuit that controls the currents $I_1$, $I_2$, . . . , and $I_N$ to be approximately equal to each other.

In an embodiment, although the currents $I_1$, $I_2$, . . . , and $I_N$ are configured to have the same current level, e.g., $V_{ADJ}/R_S$, differences may exist between the currents $I_1$, $I_2$, . . . , and $I_N$ in practical situations due to non-ideality of the circuit components such as the resistors $R_{S1}$, $R_{S2}$, . . . , and $R_{SN}$, the operational amplifiers BF1, BF2, . . . , and BFN, and so on. Such differences are allowed as long as the differences are relatively small and can be ignored.

In an embodiment, the transistors $Q_1$, $Q_2$, . . . , and $Q_N$ can also be configured to have the same characteristics, e.g., the same material, the same width-to-length ratio, etc. The LED strings S1, S2, . . . , and SN can also be configured to have the same number of LEDs and the same type of LEDs. Thus, if currents $I_1$, $I_2$, . . . , and $I_N$ at approximately the same current level flow through the LED strings S1, S2, . . . , and SN, then the voltage levels $V_{ISEN1}$, $V_{ISEN2}$, . . . , and $V_{ISENN}$ at the negative terminals $T_{NGT1}$, $T_{NGT2}$, . . . , and $I_{NGTN}$ of the LED strings S1, S2, . . . , and SN can be approximately the same. Thus, a voltage level of the voltage levels $V_{ISEN1}$, $V_{ISEN2}$, . . . , and $V_{ISENN}$ can be selected to represent all the voltage levels $V_{ISEN1}$, $V_{ISEN2}$, . . . , and $V_{ISENN}$. The selected voltage level can also represent a status of the light source 208. In an embodiment, the selector 332 can select a minimum voltage level min$V_{ISEN}$ of the voltage levels $V_{ISEN1}$, $V_{ISEN2}$, . . . , and $V_{ISENN}$ and output a signal minISEN indicative of the minimum voltage level min$V_{ISEN}$. For example, the selector 332 can transfer the minimum voltage level min$V_{ISEN}$ from its input terminal to its output terminal, and the signal minISEN is the minimum voltage level min$V_{ISEN}$. For another example, the selector 332 can receive the minimum voltage level min$V_{ISEN}$ and generate a signal minISEN that is linearly proportional to the minimum voltage level min$V_{ISEN}$. Accordingly, the selector 332 can output a signal minISEN indicative of a status of the light source 208.

In an embodiment, the error amplifier 334 can compare the signal minISEN with a reference signal DRreg and generate a compensation signal $V_{CPS}$ according to a difference between the signal minISEN and the reference signal DRreg. For example, the compensation signal $V_{CPS}$ can increase if the signal minISEN is greater than the reference signal DRreg, or decrease if the signal minISEN is less than the reference signal DRreg. The ramp generator 336 is coupled to the synchronizing terminal SYNC and can be enabled by the abovementioned positive polarity detected at the synchronizing terminal SYNC. When the ramp generator 336 is enabled, the ramp generator 336 can generate a ramp signal $V_{RAMP}$. For example, the ramp generator 336 can include a high-frequency oscillator (HFOSC) that generates a series of ramp voltages $V_{RAMP}$ at a preset frequency. The comparison circuit 338 can generate the driving signal $S_{DRV}$ by comparing the compensation signal $V_{CPS}$ with the ramp signal $V_{RAMP}$.

Figure 4:
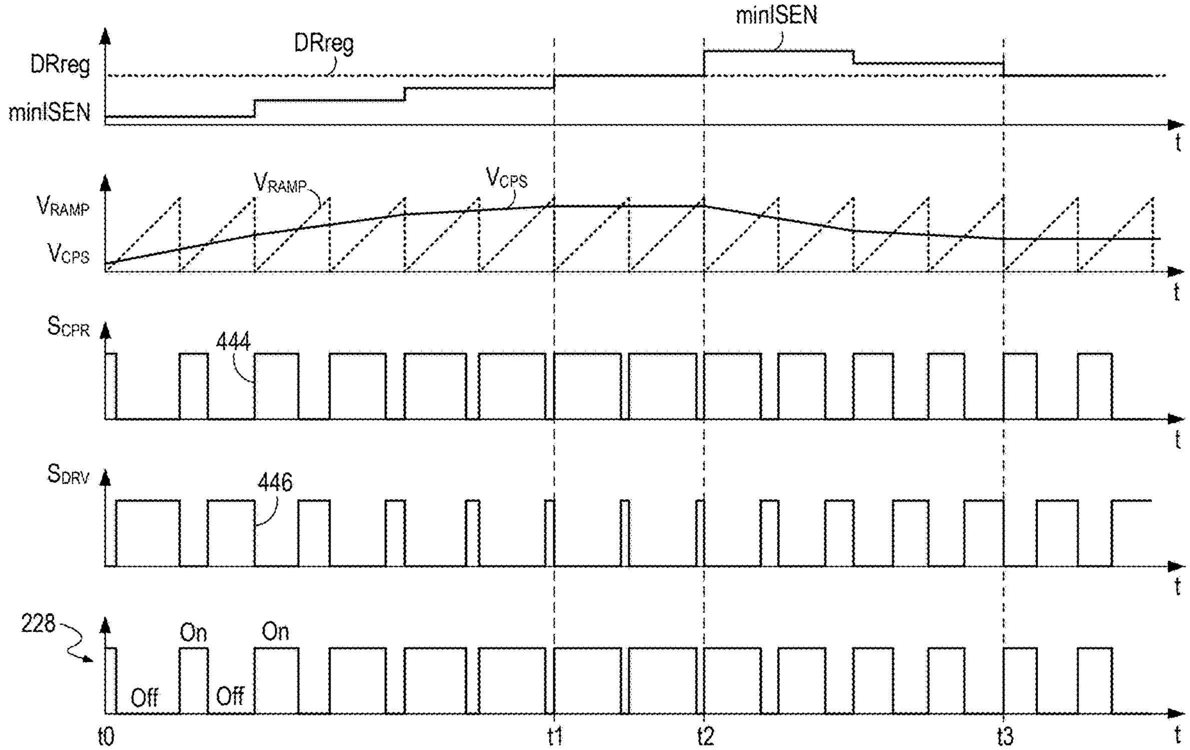
FIG. 4 illustrates waveforms of examples of signals associated with a secondary-side controller and illustrates a state of an example of a switch circuit based on statuses of the signals, in an embodiment of the present invention.

Taking FIG. 3 for example, the comparison circuit 338 can include a comparator 340 and an inverting driver 342. The non-inverting input terminal of the comparator 340 receives the compensation signal $V_{CPS}$. The inverting input terminal of the comparator 340 receives the ramp signal $V_{RAMP}$. Thus, a comparison-result signal $S_{CPR}$ that is output from the comparator 340 can include a PWM signal having a duty cycle that increases if the signal minISEN is less than the reference signal DRreg, or decreases if the signal minISEN is greater than the reference signal DRreg. The inverting driver 342 receives the comparison-result signal $S_{CPR}$ and generates the driving signal $S_{DRV}$ that is a reversed version of the comparison-result signal $S_{CPR}$ as shown in FIG. 4. As mentioned above, in an embodiment, the switch circuit 228 can be turned on by a falling edge of the driving signal $S_{DRV}$, and turned off by a rising edge of the driving signal $S_{DRV}$. Thus, the switch circuit 228 can be turned on by a rising edge of the comparison-result signal $S_{CPR}$ and turned off by a falling edge of the comparison-result signal $S_{CPR}$. In other words, the duty cycle of the switch circuit 228 can increase if the duty cycle of the comparison-result signal $S_{CPR}$ increases, or decrease if the duty cycle of the comparison-result signal $S_{CPR}$ decreases. Thus, if the signal minISEN is less than the reference signal DRreg, then the duty cycle of the comparison-result signal $S_{CPR}$ can increase, which causes the signal minISEN to increase. If the signal minISEN is greater than the reference signal DRreg, then the duty cycle of the comparison-result signal $S_{CPR}$ can decrease, which causes the signal minISEN to decrease. As a result, the signal minISEN can be regulated to the level of the reference signal DRreg. In an embodiment, the abovementioned reference level $V_{REF}$ for the voltage levels $V_{ISEN1}$, $V_{ISEN2}$, . . . , and $V_{ISENN}$ at the monitoring terminals ISEN1, ISEN2, . . . , and ISENN can include the reference signal DRreg or can be presented by the reference signal DRreg. Consequently, the voltage levels $V_{ISEN1}$, $V_{ISEN2}$, . . . , and $V_{ISENN}$ can be regulated to the reference level $V_{REF}$, and the light source 208 can be controlled to be in the normal-power state.

Although FIG. 3 shows that the comparison circuit 338 includes the comparator 340 and the inverting driver 342, the invention is not so limited. In other embodiments, the comparison circuit 338 can include other circuit structures. For example, the comparison circuit 338 may include a comparator (not shown in FIG. 3) and a driver (e.g., a non-inverting driver not shown in FIG. 3). In this example, the non-inverting input terminal of the comparator can receive the ramp signal $V_{RAMP}$. The inverting input terminal of the comparator can receive the compensation signal $V_{CPS}$. The driver receives the comparison result from the comparator and generates a driving signal $S_{DRV}$ accordingly. In this example, the driving signal $S_{DRV}$ can also control the switch circuit 228 such that the voltage levels $V_{ISEN1}$, $V_{ISEN2}$, . . . , and $V_{ISENN}$ are regulated to the reference level $V_{REF}$, and the light source 208 is controlled to be in the normal-power state.

FIG. 4 illustrates waveforms of examples of signals DRreg, minISEN, $V_{RAMP}$, $V_{CPS}$, $S_{CPR}$, and $S_{DRV}$, associated with the secondary-side controller 204, and illustrates a state of the switch circuit 228 based on statues of the signals, in an embodiment of the present invention. FIG. 4 is described in combination with FIG. 2A, FIG. 2B, and FIG. 3.

As shown in FIG. 4, during the time interval from t0 to t1, the signal minISEN is less than the reference signal DRreg (e.g., indicating that the minimum voltage level of the voltage levels $V_{ISEN1}$, $V_{ISEN2}$, . . . , and $V_{ISENN}$ at the monitoring terminals ISEN1, ISEN2, . . . , and ISENN is less than the reference level $V_{REF}$). Hence, the compensation signal $V_{CPS}$ output from the error amplifier 334 increases. When the compensation signal $V_{CPS}$ is greater than the ramp signal $V_{RAMP}$, the comparison-result signal $S_{CPR}$ can be in a logic-high state and the driving signal $S_{DRV}$ can be in logic-low state. When the compensation signal $V_{CPS}$ is less than the ramp signal $V_{RAMP}$, the comparison-result signal $S_{CPR}$ can be in a logic-low state and the driving signal $S_{DRV}$ can be in a logic-high state. The switch circuit 228 can be turned on by a falling edge 446 of the driving signal $S_{DRV}$ or a rising edge 444 of the comparison-result signal $S_{CPR}$. The switch circuit 228 can also be turned off by a rising edge of the driving signal $S_{DRV}$ or a falling edge of the comparison-result signal $S_{CPR}$. During the time interval from t0 to t1, the compensation signal $V_{CPS}$ increases, and therefore the duty cycle of the comparison-result signal $S_{CPR}$ increases, which results in the duty cycle of the switch circuit 228 increases. Accordingly, the signal minISEN increases.

During the time interval from t1 to t2, the signal minISEN is regulated to the level of the reference signal DRreg (e.g., indicating that the voltage levels $V_{ISEN1}$, $V_{ISEN2}$, . . . , and $V_{ISENN}$ are equal to or slightly greater than the reference level $V_{REF}$). The compensation signal $V_{CPS}$ can be at a relatively stable level, and the duty cycle of the switch circuit 228 can be relatively stable (e.g., substantially unchanged).

During the time interval from t2 to t3, the signal minISEN is greater than the reference signal DRreg (e.g., indicating that the minimum voltage level of the voltage levels $V_{ISEN1}$, $V_{ISEN2}$, . . . , and $V_{ISENN}$ at the monitoring terminals ISEN1, ISEN2, . . . , and ISENN is greater than the reference level $V_{REF}$). Hence, the compensation signal $V_{CPS}$ output from the error amplifier 334 decreases, which causes the duty cycle of the comparison-result signal $S_{CPR}$ to decrease. Accordingly, the duty cycle of the switch circuit 228 decreases, which causes the signal minISEN to decrease.

Thus, the signal minISEN can be regulated to the level of the reference signal DRreg. In other words, the voltage levels $V_{ISEN1}$, $V_{ISEN2}$, . . . , and $V_{ISENN}$ at the monitoring terminals ISEN1, ISEN2, . . . , and ISENN can be regulated to be equal to or slightly greater than the reference level $V_{REF}$. As a result, the light source 208 can be maintained in the normal-power state to receive sufficient power such that the brightness level of light emitted from the light source 208 can be adjusted to the target level.

Figure 5:
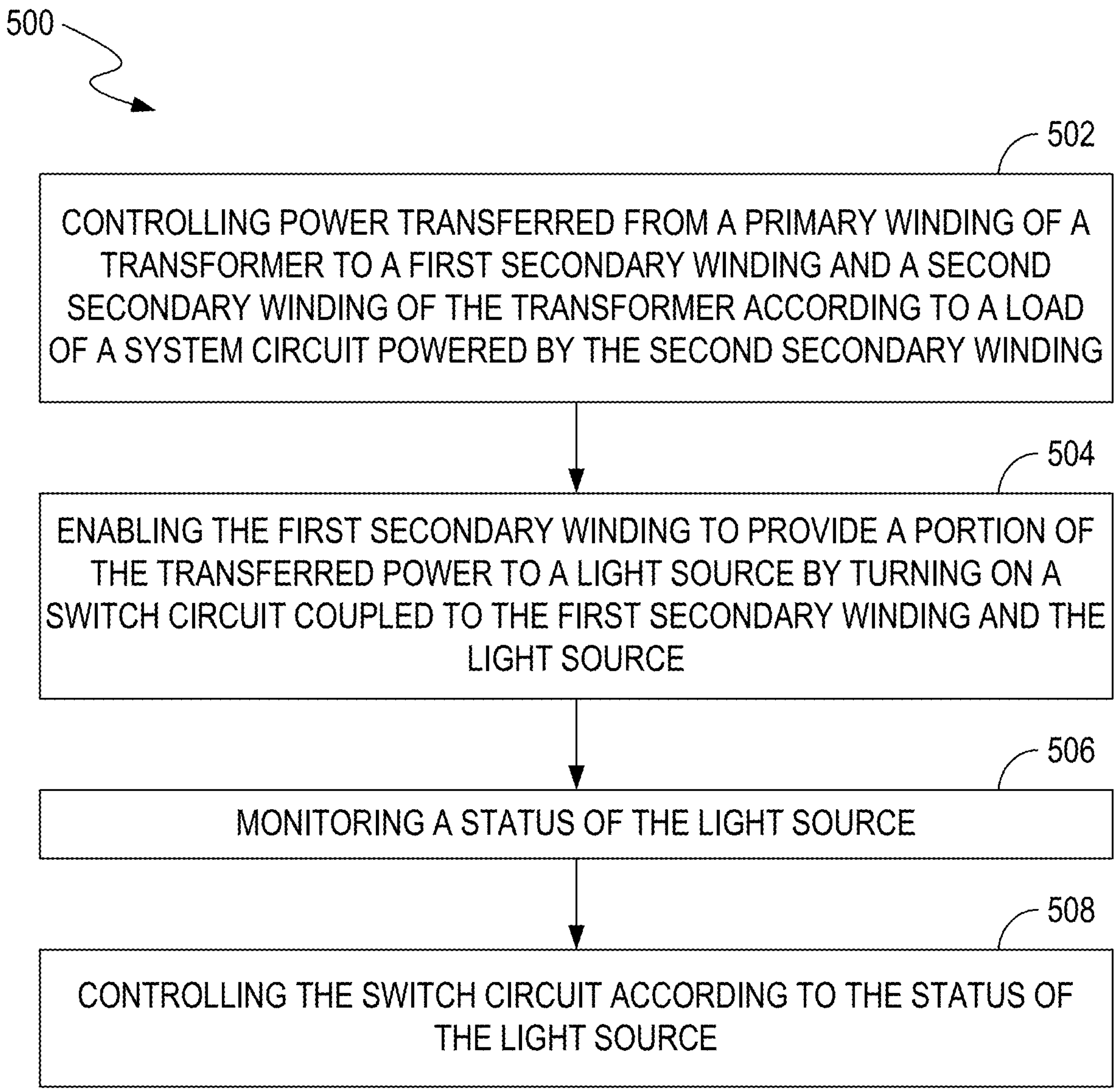
FIG. 5 illustrates a flowchart of an example of a method for controlling a light source, in an embodiment of the present invention.

FIG. 5 illustrates a flowchart 500 of an example of a method for controlling a light source 208 in a light-source driving system 200, in an embodiment of the present invention. Although specific steps are disclosed in FIG. 5, such steps are examples for illustrative purposes. That is to say, embodiments according to the present invention are well suited to performing various other steps or variations of the steps recited in FIG. 5. FIG. 5 is described in combination with FIG. 2A, FIG. 2B, FIG. 3, and FIG. 4.

At step 502, a primary-side controller 202 controls power $P_{210}$ transferred from a primary winding 212 of a transformer 210 to a first secondary winding 214 and a second secondary winding 216 of the transformer 210 according to a load of a system circuit 206 that is powered by the second secondary winding 216.

At step 504, a secondary-side controller 204 enables the first secondary winding 214 to provide a portion $P_{208}$ of the transferred power $P_{210}$ to a light source 208 by turning on a switch circuit 228 coupled to the first secondary winding 214 and the light source 208.

At step 506, the secondary-side controller 204 monitors a status of the light source 208, e.g., by monitoring voltage levels $V_{ISEN1}$, $V_{ISEN2}$, . . . , and $V_{ISENN}$ at the negative terminals $T_{NGT1}$, $T_{NGT2}$, . . . , and $T_{NGTN}$ of the LED strings S1, S2, . . . , and SN.

At step 508, the secondary-side controller 204 controls the switch circuit 228 according to the status of the light source 208 such that the light source 208 remains in a normal-power state.

As a result, in an embodiment, whether the system circuit 206 is a light load, normal load, or heavy load, the light source 208 can receive sufficient power to support the LED strings to emit lights at target brightness levels. In addition, the DC/DC converter 118 in the conventional light-source driving system 100 can be omitted in the light-source driving system 200, which lowers the cost of the light-source driving system 200 and reduces the size of printed circuit board thereof.

While the foregoing description and drawings represent embodiments of the present invention, it will be understood that various additions, modifications, and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A light-source driving system comprising:

a first controller configured to control power transferred from a primary winding of a transformer to a first secondary winding and a second secondary winding of said transformer according to a load of a system circuit powered by said second secondary winding;

a switch circuit configured to enable said first secondary winding to provide a portion of said power to a light source when said switch circuit is turned on; and a second controller, coupled to said switch circuit and said first controller, and configured to monitor a status of said light source and control said switch circuit according to said status, wherein said second controller comprises:

a driving terminal configured to provide a driving signal to control said switch circuit; and a synchronizing terminal configured to detect an electrical polarity of an output terminal of said second secondary winding, wherein said second controller is configured to generate said driving signal according to said status when a positive polarity is detected at said synchronizing terminal, and configured to pause generating said driving signal when said positive polarity is not detected at said synchronizing terminal.

2. The light-source driving system of claim 1, wherein said second controller further comprises:

an error amplifier configured to generate a compensation signal according to a difference between a signal indicative of said status of said light source and a reference signal;

a ramp generator, coupled to said synchronizing terminal, and configured to be enabled by said positive polarity, wherein when said ramp generator is enabled, said ramp generator is configured to generate a ramp signal; and a comparison circuit, coupled to said error amplifier and said ramp generator, and configured to generate said driving signal by comparing said compensation signal with said ramp signal.

3. The light-source driving system of claim 1, wherein said first controller increases said power if said load increases and reduces said power if said load decreases.

4. A light-source driving system comprising:

a first controller configured to control power transferred from a primary winding of a transformer to a first secondary winding and a second secondary winding of said transformer according to a load of a system circuit powered by said second secondary winding;

a switch circuit configured to enable said first secondary winding to provide a portion of said power to a light source when said switch circuit is turned on; and a second controller, coupled to said switch circuit and said first controller, and configured to monitor a status of said light source and control said switch circuit according to said status, wherein said second controller comprises:

a monitoring terminal configured to monitor said status of said light source; and an adjusting terminal configured to receive an adjusting signal indicating a target level of a current through said light source, wherein said second controller is configured to adjust said current to said target level when said status of said light source indicates that said light source is in a normal-power state.

5. The light-source driving system of claim 4, wherein said second controller is configured to control said light source to be in said normal-power state by: increasing a duty cycle of said switch circuit if a voltage level at said monitoring terminal is less than a reference level, and reducing said duty cycle of said switch circuit if said voltage level is greater than said reference level.

6. The light-source driving system of claim 4, wherein said light source comprises an LED (light-emitting diode) string comprising at least one LED, wherein a positive terminal of said LED string is configured to receive said portion of said power, wherein a negative terminal of said LED string is coupled to a reference ground through a transistor and a resistor, and wherein said monitoring terminal is configured to monitor said status of said light source by sensing a voltage level at said negative terminal.

7. The light-source driving system of claim 6, wherein said adjusting signal comprises a PWM (pulse with modulation) signal, and wherein said second controller comprises:

a converter configured to convert a duty cycle of said PWM signal to an adjusting voltage; and an adjusting circuit, coupled to said converter, and configured to apply said adjusting voltage to said resistor by controlling said transistor such that a current through said LED string is adjusted to said target level.

8. A method for controlling a light source, comprising:

controlling power transferred from a primary winding of a transformer to a first secondary winding and a second secondary winding of said transformer according to a load of a system circuit powered by said second secondary winding;

enabling said first secondary winding to provide a portion of said power to a light source by turning on a switch circuit coupled to said first secondary winding and said light source;

monitoring a status of said light source;

controlling, using a controller coupled to said switch circuit and said light source, said switch circuit according to said status;

receive an adjusting signal, at an adjusting terminal of said controller, indicating a target level of a current through said light source;

adjusting said current through said light source to said target level when said status of said light source indicates that said light source is in a normal-power state;

monitoring said status of said light source by sensing a voltage level at a negative terminal of an LED (light-emitting diode) string in said light source, wherein said negative terminal is coupled to a reference ground through a transistor and a resistor;

receiving a PWM (pulse with modulation) signal at said adjusting terminal;

converting a duty cycle of said PWM signal to an adjusting voltage; and applying said adjusting voltage to said resistor by controlling said transistor such that a current through said LED string is adjusted to said target level.

9. The method of claim 8, further comprising:

detecting an electrical polarity of an output terminal of said second secondary winding;

generating a driving signal to control said switch circuit according to said status when a positive polarity is detected at said output terminal; and pausing said generating of said driving signal when said positive polarity is not detected at said output terminal.

10. The method of claim 8, further comprising:

increasing said power if said load increases; and reducing said power if said load decreases.

11. The method of claim 8, further comprising:

controlling said light source to be in said normal-power state by:

increasing a duty cycle of said switch circuit if said voltage level at said negative terminal is less than a reference level; and reducing said duty cycle of said switch circuit if said voltage level is greater than said reference level.

12. A light source controller comprising:

a monitoring terminal configured to monitor a status of a light source that is powered by a first secondary winding of a transformer comprising a primary winding, said first secondary winding, and a second secondary winding;

a driving terminal configured to provide a driving signal to control a switch circuit that, when said switch circuit is turned on, enables said first secondary winding to provide said light source with a portion of power transferred from said primary winding to said first and second secondary windings;

a synchronizing terminal configured to detect an electrical polarity of an output terminal of said second secondary winding; and control circuitry, coupled to said monitoring terminal, said driving terminal, and said synchronizing terminal, configured to generate said driving signal according to said status of said light source when a positive polarity is detected at said synchronizing terminal, and configured to pause generating said driving signal when said positive polarity is not detected at said synchronizing.

13. The light source controller of claim 12, wherein said control circuitry comprises:

an error amplifier configured to generate a compensation signal according to a difference between a signal indicative of said status of said light source and a reference signal;

a ramp generator, coupled to said synchronizing terminal, and configured to be enabled by said positive polarity, wherein when said ramp generator is enabled, said ramp generator is configured to generate a ramp signal; and a comparison circuit, coupled to said error amplifier and said ramp generator, and configured to generate said driving signal by comparing said compensation signal with said ramp signal.

14. The light source controller of claim 12, further comprising:

an adjusting terminal configured to receive an adjusting signal indicating a target level of a current through said light source, wherein said control circuitry is further configured to adjust said current to said target level when said status of said light source indicates that said light source is in a normal-power state.

15. The light source controller of claim 14, wherein said control circuitry is further configured to control said light source to be in said normal-power state by increasing a duty cycle of said switch circuit if a voltage level at said monitoring terminal is less than a reference level and reducing said duty cycle of said switch circuit if said voltage level is greater than said reference level.

16. The light source controller of claim 14, wherein said monitoring terminal is configured to monitor said status of said light source by sensing a voltage level at a negative terminal of an LED (light-emitting diode) string in said light source, wherein said negative terminal is coupled to a reference ground through a transistor and a resistor.

17. The light source controller of claim 16, wherein said adjusting signal comprises a PWM (pulse with modulation) signal, and wherein said control circuitry comprises:

a converter configured to convert a duty cycle of said PWM signal to an adjusting voltage; and an adjusting circuit, coupled to said converter, and configured to apply said adjusting voltage to said resistor by controlling said transistor such that a current through said LED string is adjusted to said target level.

* * * * *